April 5, 1927.
J. MOORES
1,623,357
TRANSFER DEVICE
Filed March 14, 1923     4 Sheets-Sheet 1
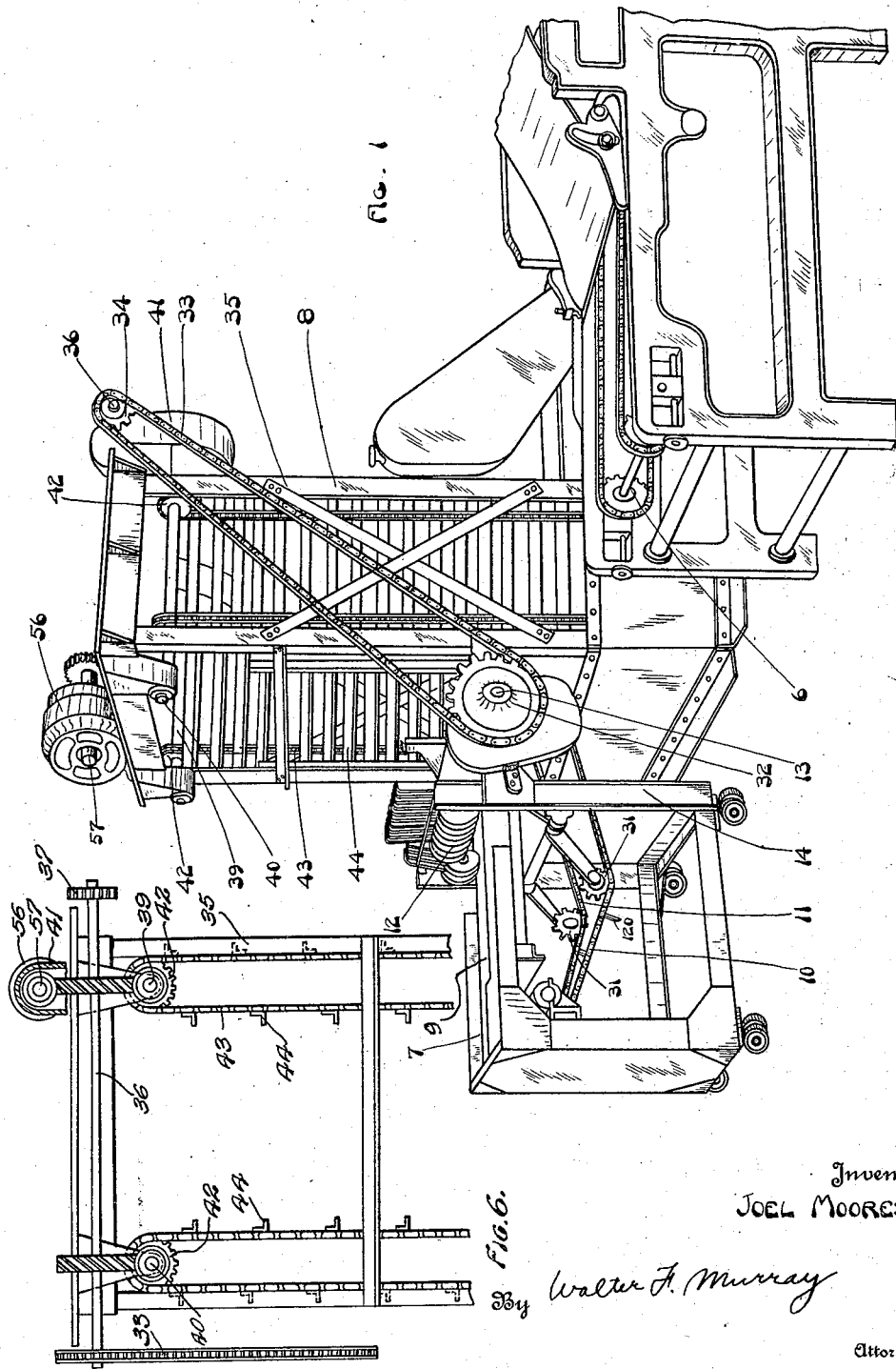
Inventor
JOEL MOORES
By Walter F. Murray
Attorney

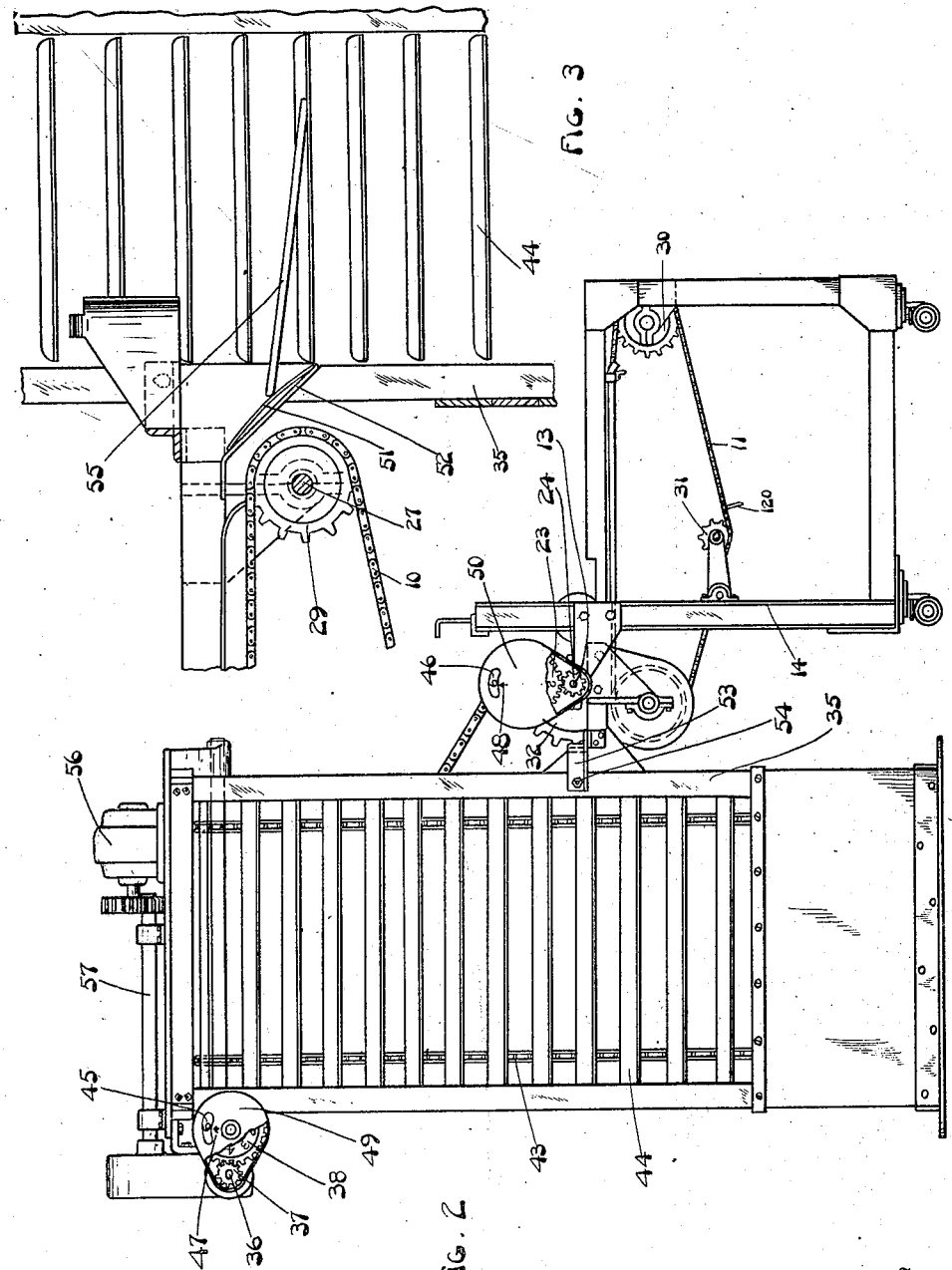

April 5, 1927.

J. MOORES 1,623,357

TRANSFER DEVICE

Filed March 14, 1923    4 Sheets-Sheet 3

Inventor
JOEL MOORES

By Walter F. Murray
Attorney

April 5, 1927.

J. MOORES

TRANSFER DEVICE

Filed March 14, 1923    4 Sheets-Sheet 4

1,623,357

Inventor
JOEL MOORES
By Walter F. Murray
Attorney

Patented Apr. 5, 1927.

1,623,357

UNITED STATES PATENT OFFICE.

JOEL MOORES, OF CINCINNATI, OHIO, ASSIGNOR TO THE J. H. DAY COMPANY, OF CINCINNATI, OHIO, A CORPORATION OF OHIO.

TRANSFER DEVICE.

Application filed March 14, 1923. Serial No. 624,910.

My invention relates to transfer devices to be used in bakeries and the like in conjunction with machines for cutting cakes such as fig Newton bars and the like and for automatically transferring the containers or pans carrying the cakes to a conveyor adapted to carry the pans to attendants who remove the cakes from the pans. Heretofore it has been necessary to effect the transfer of the pans carrying the cut cakes from the cutting machine to the conveyor, by manual means.

An object of my invention is to provide automatic means for effecting the transfer of pans of cut cakes between the devices referred to.

Another object of my invention is to provide means that will so synchronize the action of the cutting machine, the conveyor and the transfer mechanism that the maximum efficiency with a minimum of labor, observation and attention may be attained.

Another object of my invention is to provide a device for the purposes stated having a minimum of parts whereby to minimize the cost of production and operation.

These and other objects are attained by the means described herein, and disclosed in the accompanying drawings, in which:

Fig. 1 is a perspective view of a series of conveyors, a cutting device, and means associated with the cutting device and conveyors, and embodying my invention.

Fig. 2 is a side elevation of parts of the device shown in Fig. 1, parts being broken away.

Fig. 3 is a fragmental sectional view of parts shown in Fig. 4.

Fig. 6 is a fragmental sectional view on line 6—6 of Fig. 2.

Figure 4:
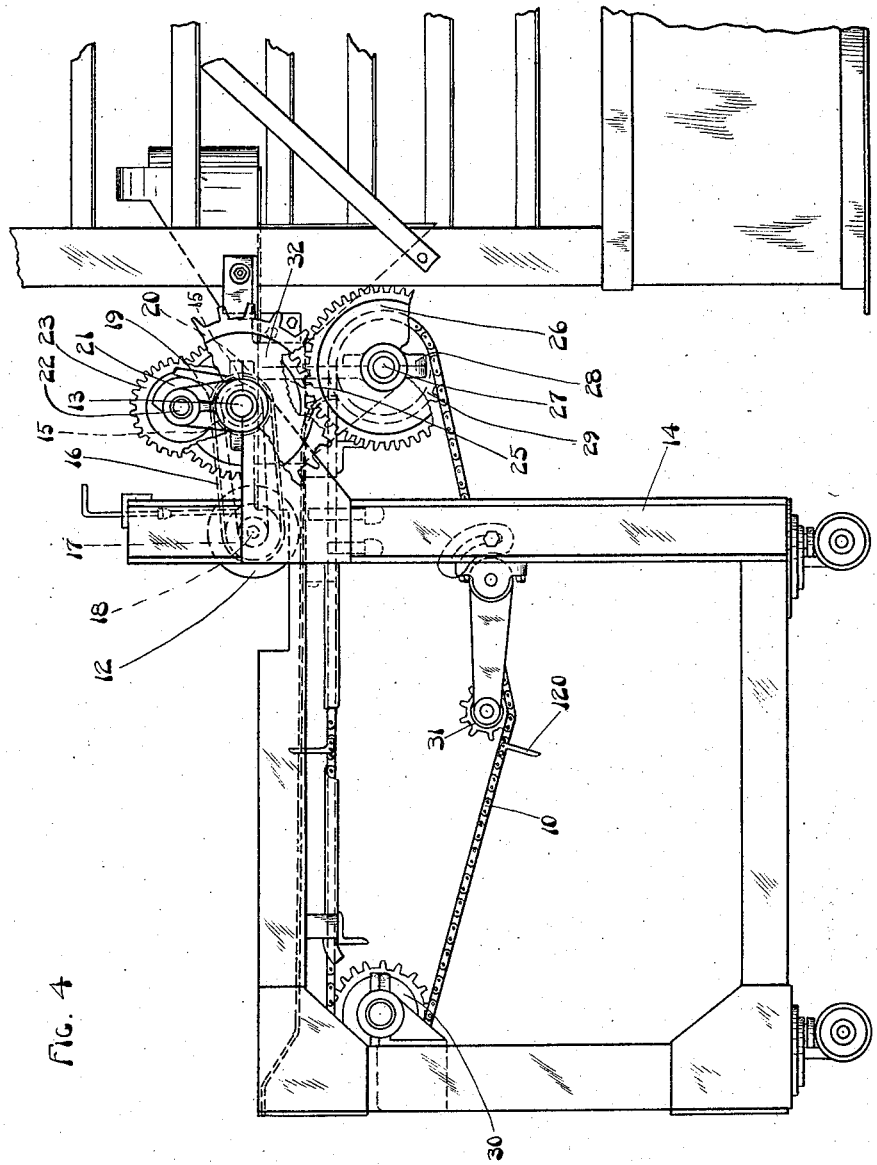
Fig. 4 is an enlarged fragmental side elevation of parts shown in Fig. 2, and showing the opposite side from that disclosed in Fig. 2.
Figure 5:
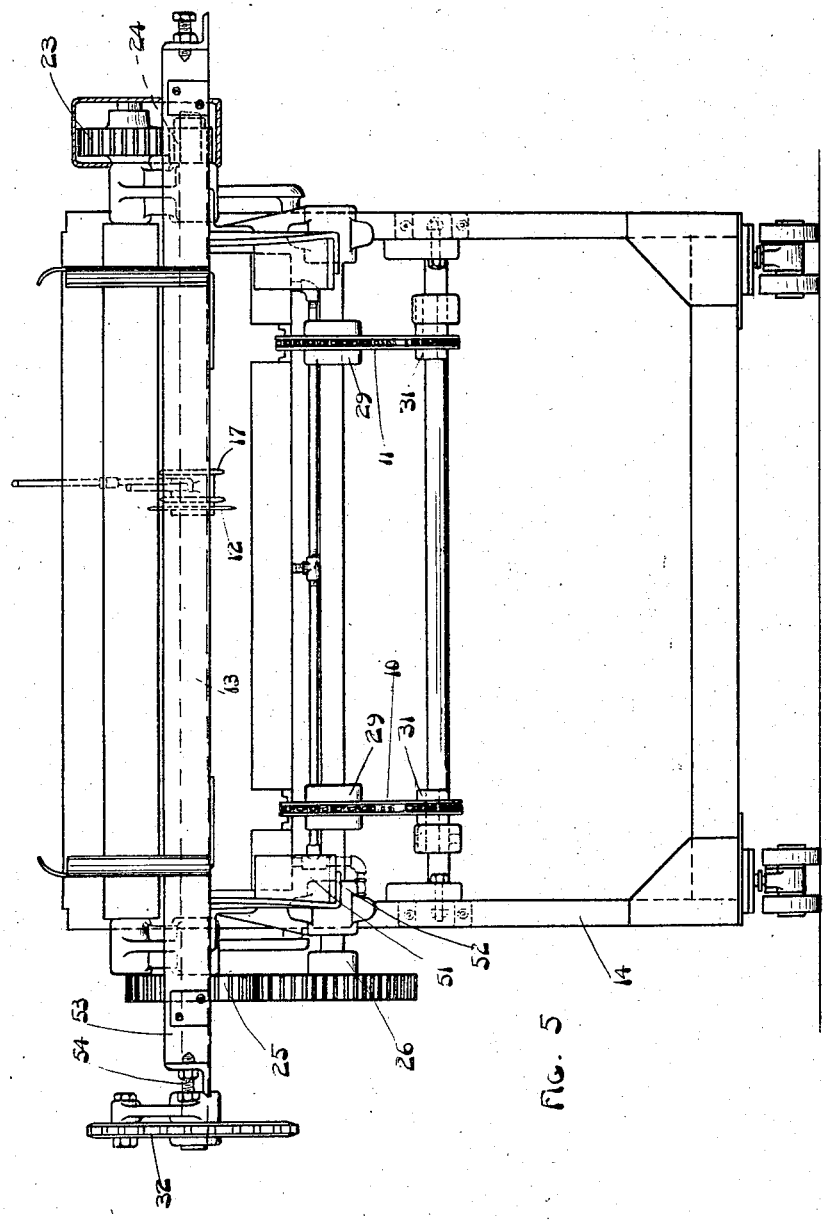
Fig. 5 is an end elevation of a cutting and transfer mechanism forming details of my invention.

Referring to Fig. 1, pans or the like are carried by the conveyor 6. The pans carry cakes and the like to be baked. Attendants take the pans from conveyor 6 and place same in an oven following the removal of pans of baked cakes from the oven by other attendants. The pans of baked cakes are placed on the cutting device 7 by the attendants, from whence the pans, together with the cut cakes, pass to the conveyor 8. The cutting device 7 may be of any suitable type, and comprises preferably a pair of endless chains 10 and 11 carrying suitable lugs 120 for moving pans over the table 9 and for carrying the pans below the cutters 12. The cutters 12 are generally rotary discs driven by any suitable drive mechanism from the shaft 13 carried by the frame 14 of the cutting device, for example as shown in Fig. 4, the shaft 13 carries a series of sprockets 15 about which extend sprocket chains 16. The chains 16 drive through the sprockets 17 revolubly mounted on the shaft 18 revolubly supporting the cutting discs 12. Means are provided for raising and lowering the cutters to permit the passage there below of succeeding pans. This action may be accomplished in any suitable manner such as by means of an arm 19 carried by a frame 20 revolubly mounted on the shaft 13 and supporting the shaft 18. The arm 19 engages a cam 21 revolubly mounted on the shaft 22 driven by the gear 23 from the gear 24 mounted on the shaft 13. The shaft 13 also carries a gear 25 that drives the gear 26 carried by the shaft 27. The shaft 27 is supported upon the frame 14 of the cutting machine in any suitable manner such as by means of suitable brackets 28. The shaft 27 also carries a pair of sprockets 29 about which the chains 10 and 11 extend. The chains 10 and 11 extend about suitable sprockets 30 and 31 for positioning the upper portions of the chains in such relation to the table 9 that the lugs 120 will move pans over the table and beneath the cutting disks 12, and for taking up any play in the chains. The shaft 13 is driven through a sprocket 32 carried by the shaft and by means of a sprocket chain 33 extending about the sprocket 32 and a sprocket 34 carried by the frame 35 of the conveyor 8. The sprocket 34 is mounted on one end of the shaft 36 extending transversely of the frame 35. The shaft 36 also carries, at its other end, a gear 37 that meshes with an index gear 38 carried by the frame 35. The frame 35 supports, at its upper end, longitudinally extending shafts 39 and 40 that are driven from the shaft 36 in any suitable manner, such as by means of spiral gears contained within a suitable housing 41. The shafts 39 and 40 carry sprockets 42 about which extend endless chains 43 carrying angle irons 44, the angle irons carried by the chains 43 are disposed in horizontal planes, whereby each pair of angle irons 44 will support a tray and will convey the trays vertically. The gears of the several mechanisms are so related that when corresponding index characters 45 and 46 carried by the index 38 and 23 respectively, are disposed in the same relation to a suitable indicating mark 47 and 48 carried by the casings 49 and 50 of said index gears, the cutting device and the conveyor 8 will be actuated in synchronism, whereby to effect an automatic discharge of pans from the cutting device upon a determinable pair of angle irons 44 of the conveyor 8. The pans passing from the cutting device 7 are projected into the conveyor 8 by means of the lugs 120. After the lugs 120 cease to operate upon the pans, the rearmost end of the pan engages the yielding bars 51 carried by the inclined flanges 52 formed on the frame 14 of the cutting device. The cutting device may be moved to and from operative positions in relation to the conveyor 8, and may be secured in operative relationship to the frame 35 of the conveyor 8 by any suitable means such as angle plates 53 carried by the cutting device 7 and suitable bolts 54. When the cutting device is in its operative position in relation to the conveyor 8, the lower ends of the inclined flanges 52 and yielding bars 51 are disposed immediately adjacent the vertical line of movement of the angle irons 44. In Fig. 3 is shown a pan 55 in the act of movement from the cutting device 7 to a pair of angle irons 44. After the angle plates 44 are moved downward, the co-operation of the force of gravity and the yielding plates 51 serve to slide and guide the pans 55 downwardly and forwardly so as to dispose the pan 55 in such position that it will clear the lower edge of the inclined flanges or plates 52 and yielding bars 51 and will be carried onward by the angle plates 44. The device will also function for transferring pans 55 to the angle plates 44 when moving vertically upward.

In the operation of my device, an attendant first positions the cutting device 7 in operative relation to the conveyor 8. The sprocket 32 would then be actuated until the index gears 38 and 23 were in proper positions as described. The chain 33 would then be applied about the sprockets 32 and 36. Movement is imparted to the shaft 36 from any suitable source such as the motor 56 and suitable shafting and gears shown generally at 57. An attendant would then place pans carrying articles to be cut upon the table 9, whereupon the lugs 120 would carry the pans 55 below the cutting discs and would project the pans between the angle plate 44 disposed at opposite sides of the frame 35 of the conveyor 8. The pans would then move under the influence of gravity, downwardly over the inclined yielding plates 51 and would be lodged within the body line of the conveyor 8, so that the pans could be moved vertically. Any suitable means may be employed to remove the pans from the angle plates 44.

What I claim is:

1. In a device of the class described the combination of a vertical conveyor comprising pairs of vertically moving angle plates for receiving trays, a horizontal conveyor comprising horizontally moving lugs for moving trays into the plates of movement of the angle plates, and inclined plates having their upper ends disposed in substantial horizontal alignment with the normal line of movement of a tray carried by the horizontal conveyor and having their lower ends disposed immediately adjacent the line of movement of the angle plates whereby trays discharged by the horizontal conveyor may engage the inclined plates and be moved under the influence of gravity for positioning trays upon the angle plates, means for synchronously actuating the conveyors, and indexing means for determining the relationship of the lugs and the angle plates whereby to permit relative adjustment of the lugs and the angle plates for effecting synchronous cooperation of the conveyors.

2. The combination of a vertical conveyor for pans, a horizontal conveyor for pans, the horizontal conveyor having its discharge-end spaced from the vertical conveyor, the horizontal conveyor adapted to project pans into the path of the vertical conveyor, an inclined plate extending between the conveyors and a yielding bar carried by the inclined plate for engagement by pans projected into the path of the vertical conveyor, the movement of the pans by the vertical conveyor over the yielding bar serving to bring the pans wholly beyond the inclined plate and yielding bar.

3. In a device of the class described, the combination of a pair of cooperating non-overlapping endless conveyors for moving pans in different directions of plates interposed between the conveyors for engagement by pans moving between the conveyors, the pans and plates cooperating for utilizing motion imparted to the pans by the conveyors for moving the pans over the plates and from one conveyor to the other conveyor.

4. The combination of non-overlapping vertical and horizontal conveyors for pans, and an angular plate extending between the conveyors and over which plate pans are projected by one conveyor into the path of the second conveyor, the second conveyor adapted to move a pan along the inclined plate for bringing the pan into such position on the second conveyor that the pan may move beyond the inclined plate.

In testimony whereof, I have hereunto subscribed my name this seventh day of March, 1923.

JOEL MOORES.